Aug. 30, 1932.  J. F. BANTZ ET AL  1,874,418
SANITARY CHICKEN FEEDER
Filed May 26, 1931  2 Sheets-Sheet 1

Inventor
John F. Bantz
Raymond Smith
By Clarence A. O'Brien
Attorney

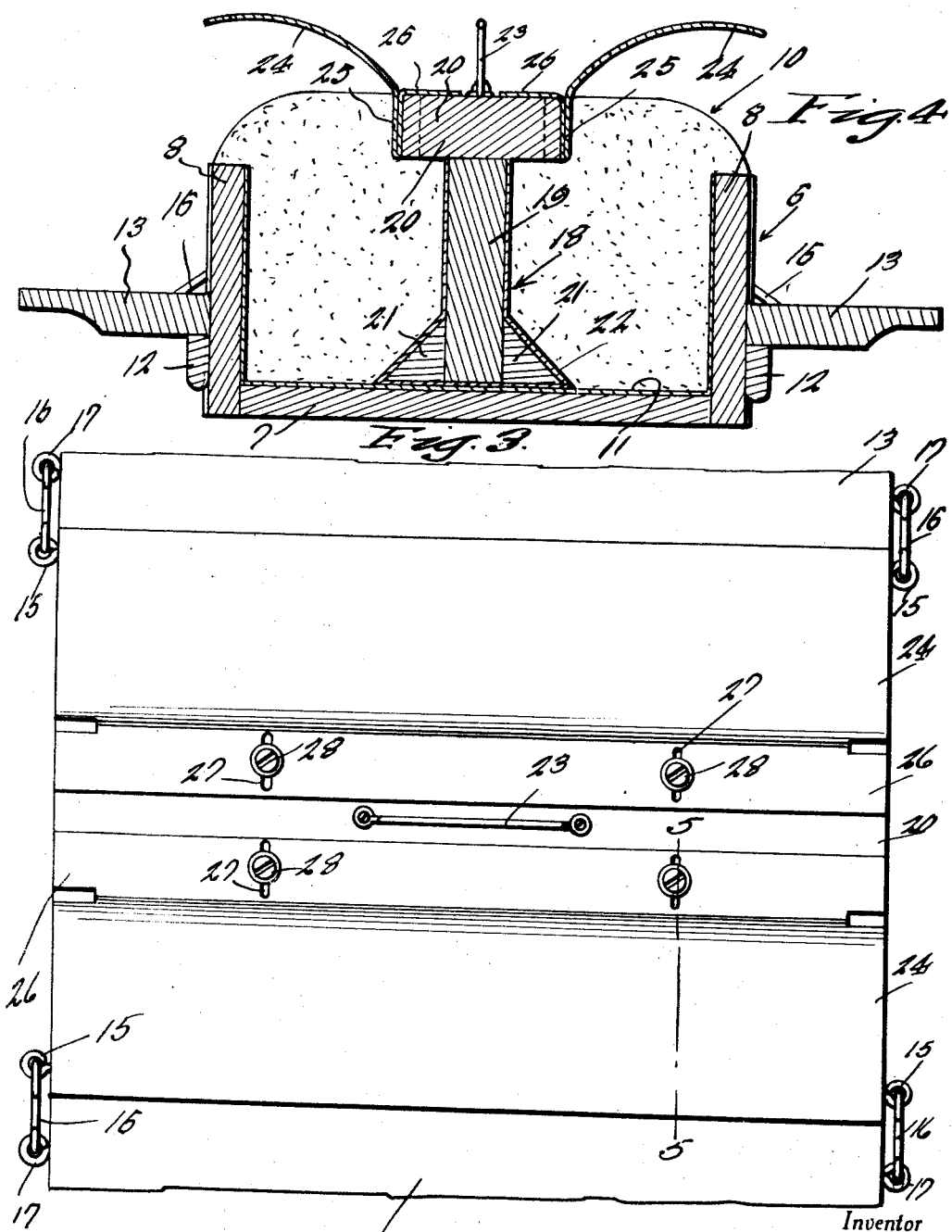

Patented Aug. 30, 1932

1,874,418

UNITED STATES PATENT OFFICE

JOHN F. BANTZ AND RAYMOND SMITH, OF PERRYSVILLE, INDIANA; SAID SMITH ASSIGNOR TO SAID BANTZ

SANITARY CHICKEN FEEDER

Application filed May 26, 1931. Serial No. 540,180.

This invention relates to an improved chicken feeder herein specifically referred to as a sanitary clabber-milk chick feeder.

Being familiar with many marketed and patented types of chicken feeders, and conversant with the disadvantages and difficulties of such prior art devices, we have, through experiment and study, discovered and developed a structurally improved and refined device which, we believe, constitutes an unequalled achievement in this particular line of endeavor.

Briefly and structurally stated, our improved structure is characterized by simplicity, efficiency, sanitation, economy in construction and usage, and many other advantages such as fulfill the requirements of a feeder of this class in a highly satisfactory manner.

The particular details employed in this improved organization of parts will become more readily apparent from the following description and drawings.

In the drawings:

Figure 3 is a fragmentary top plan view thereof.

Figure 4 is a transverse vertical section on the line 4—4 of Figure 2.

Figure 1:
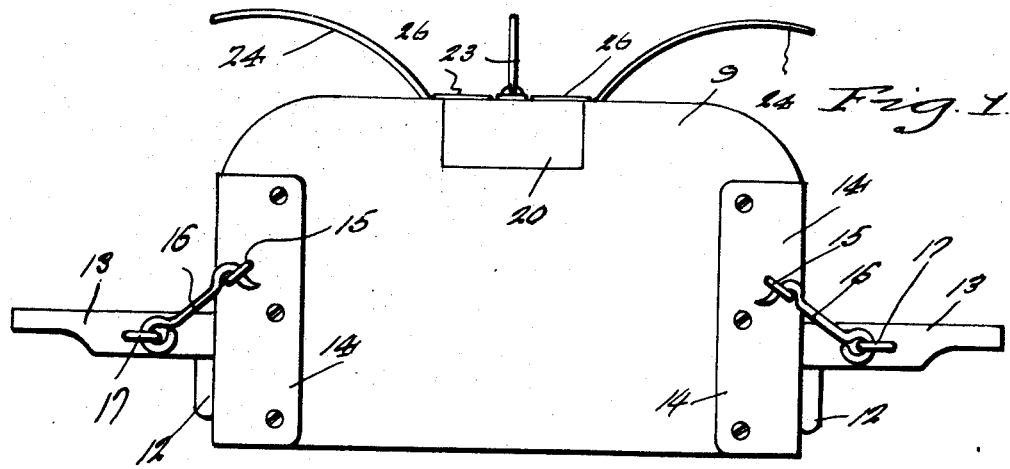
Figure 1 is an end view of a feeder designed and constructed in accordance with the present inventive conception.
Figure 2:
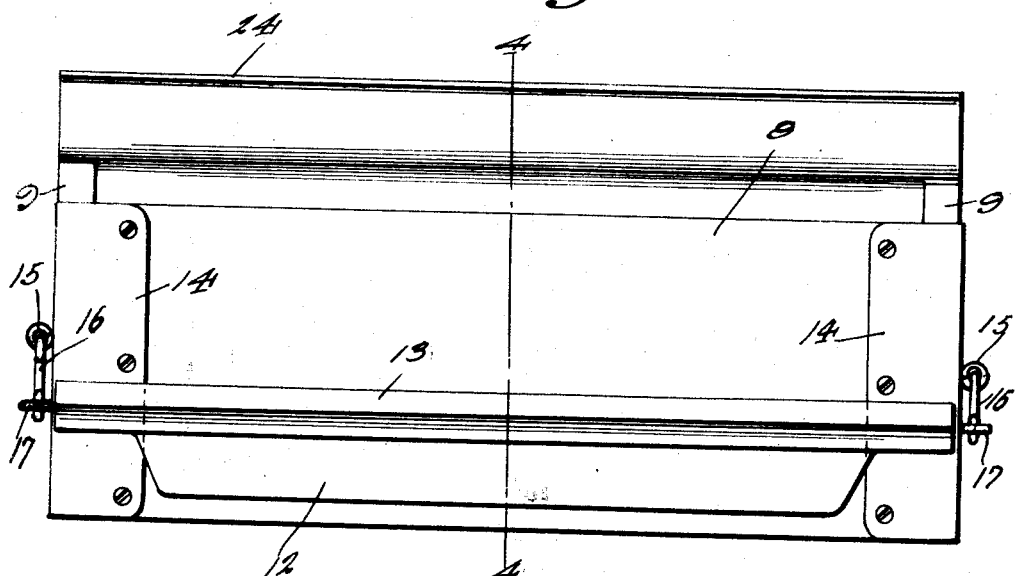
Figure 2 is a side elevational view of the structure seen in Figure 1.
Figure 5:
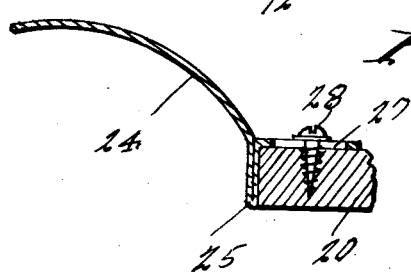
Figure 5 is a detail section on the line 5—5 of Figure 3.

A consideration of Figure 4 in conjunction with the other figures will verify the fact that a primary part of the structure is the receptacle or container generally designated by the numeral 6. This is preferably of rectangular box-like form and includes a substantially flat bottom 7, spaced parallel longitudinal or side walls 8, and transverse end walls 9. Incidentally the end walls are slightly higher than the side walls and are formed intermediate their ends with notches.

This receptacle is primarily adapted to contain clabber milk 10 which constitutes an ideal food for chickens, especially small chicks. The inner surfaces of the walls of this box-like container are coated with suitably hardened paraffine or equivalent nonadhesive material 11. On the exterior of the walls 8 near the bottom we nail or otherwise fasten longitudinal rails or cleats 12 which function as supporting ledges for the inner adjacent edges of the outstanding roosting platform 13.

In this connection we invite attention to Figure 1 wherein it will be noted that the numerals 14 designate wear plates secured to the outer surfaces of the end walls 9, these being provided with keeper eyes 15. Cooperable with these eyes are attaching and sustaining hooks 16 fastened to the ends of the platform board through the medium of eye bolts 17. This makes the platform detachable.

The numeral 18 designates a removable insert which is generally referred to in the trade as a plunger. This is primarily in the nature of a divider which separates the box into individual feeding compartments. This plunger includes a vertical longitudinally extending partition member 19 having a topping rail 20 fastened thereto. This makes the plunger somewhat T-shaped in cross section as seen in Figure 4.

Attached to the opposite faces of the lower end portion of the board 19 are V-shaped runners 21 which formulate the head of the plunger. The exposed surfaces of these parts 21 as well as the opposite faces of the board 19 are coated or faced with a paraffine 22. The numeral 23 merely designates a carrying bail or handle to expedite the insertion and removal of the plunger.

The numerals 24 designate companion duplicate sections carried by the topping rail 20 and co-operating therewith in forming a roof or cover for the feeding. It will be noted that these sections each extend outwardly from the plunger and overlie the contents 10 of the receptacle. In fact, each section is in the nature of a transversely curved plate of the relative proportion depicted in Figure 4.

This plate is bent intermediate its ends as at 25 to form an abutment flange bearing against the adjacent longitudinal edge of the rail 20 and an attaching and adjusting flange 26. The last named flange is formed with an elongated slot 27 with which a suitable fastening 28 co-operates to adjustably attach the plate sections to the plunger. This provides a slight lateral adjustment of the plate.

In practice, the container is of any appropriate width and depth and is proportioned suitably for chicks of any age up to ten weeks old. The principal parts of the plunger and container are of wood, or other non-corrosive material and coated or faced with paraffine.

It is evident that this coating material forms a lining for the receptacle and a facing for the plunger in order to prevent the absorption of moisture and to facilitate expeditious cleaning. The plunger, as a unit, is removable for the purpose of filling and cleaning the feeder. When the clabber is placed in the feeder, the plunger, when put in, obviously forces the clabber out to the sides of the receptacle and displaces it upwardly so that it assumes the packed condition represented in Figure 4 of the drawings.

The V-shaped or triangular bead 21 attached to the lower end portion of the partition 19 forms a sort of a wedge-shaped head which facilitates in lifting a portion of the remaining contents after the structure is substantially empty. The slidable adjustment and attaching flanges 26 facilitates relative lateral adjustment of the overhanging spaced roofing plates 24.

It is conceded by poultrymen everywhere that clabber-milk is the ideal baby chick food, both from the standpoint of food qualities and economic cost. The difficulties met in feeding it and obtaining desired results have been and are many. Among them are the following:

Clabber-milk fed in metal feeders becomes poisonous in its effect. To avoid this, it seems to be necessary that the feeder be made of other materials insofar as the parts thereof which come in contact with the milk are concerned. To avoid this, the sanitary clabber-milk feeder is made of wood, glass, or such material as earthenware, crocks, and dishes are made of.

Clabber-milk fed to chicks in fountains usually drains out the whey, while the curd or clabber part of the milk remains in the fountain so that the chicks cannot get it. The sanitary clabber-milk chick feeder avoids this difficulty by presenting the clabber directly to the chick so that it can feed upon it at will.

In feeding clabber-milk to chicks in a pan or open vessel the chicks get in it with their feet. Their downy body becomes wet and soiled and they don't thrive. In feeding clabber-milk to chicks in pans or open vessels, the chicks get filth in the clabber off of their feet and in addition thereto more or less of the droppings of the chicks get into the clabber, creating an unsanitary and unhealthy condition of the food, resulting in necessary waste of food and often loss of chicks.

The sanitary clabber feeder owing to its construction and adjustable cover, makes it impossible for the chick to soil itself by getting into its food. It is prevented from getting its feet and consequent filth into its food and the overhanging cover makes it impossible for any droppings to fall into the feeder and food therein, even though the chick roosts thereon. This is important as the droppings from a diseased chick falling into the food supply may, and often does, result in increased contagion and great loss of chicks.

The practice of feeding clabber-milk in fountains or open vessels is unsanitary and wasteful. This is overcome in the sanitary clabber-milk chick feeder by reason of the following. It is proportioned right. The chicks can get all the food while it is fresh without getting in it, or without befouling it in any way.

The smallest chick, by means of the running board on the sides of the feeder can get it; or if the chicks are larger these side boards can be removed.

Chicks fed clabber-milk in pans or open vessels get in it with their feet and directly the floor or litter covering the floor of the brooder house becomes wet and saturated with the clabber creating at once uncomfortable, unsanitary and unhealthy conditions and environment for them, and which invites disease and loss of chicks and besides waste of foods, produces offensive odors and making the care of the brooder house an extremely disagreeable task.

All this is overcome by the sanitary clabber-milk chick feeder. The chicks cannot get their feet in their food, hence the floor and litter in the brooder house are kept dry. The health of the chicks is promoted and foul odors and offensive and disagreeable conditions are prevented.

This sanitary clabber-milk chick feeder—
1. Saves chicks, by avoiding losses caused by feeding in metal feeders.
2. Is cleanly, making healthy chicks.
3. Is economical, saves food by preventing waste.

4. Easily handled, makes it possible to avoid the messy and disagreeable task found necessary in using and caring for other feeders and fountains.

5. Increases profits, by promoting rapid growth of chicks under the most favorable conditions for them.

It is thought from the foregoing description that the advantages and novel features of the invention will be readily apparent.

It is to be understood that changes may be made in the construction and in the combination and arrangement of the several parts provided that such changes fall within the scope of the appended claims.

We claim:

1. In a chicken feeder of the class described, a receptacle constructed of non-corrosive materials, and a removable partitioning divider arranged in said receptacle, said divider being constructed to function as a plunger, and including oppositely disposed outstanding plate sections co-operating with the plunger in defining an overhanging roof for the feeder.

2. A chicken feeder of the class described comprising an open top box-like feed receptacle including a bottom, spaced parallel side walls and connecting end walls, said end walls being higher than the side walls and formed intermediate their ends with notches constituting keeper seats, a removable divider and partitioning unit arranged in said receptacle and including a vertical partitioning board and a topping rail, the ends of said rail being removably placed in said keeper seats.

3. A chicken feeder of the class described comprising an open top box-like feed receptacle including a bottom, spaced parallel side walls and connecting end walls, said end walls being higher than the side walls and formed intermediate their ends with notches constituting keeper seats, a removable divider and partitioning unit arranged in said receptacle and including a vertical partitioning board and a topping rail, the ends of said rail being removably placed in said keeper seats, and a pair of companion roofing plates, said plates being of transversely curved form and having their inner longitudinal edges fashioned to provide a pair of flanges, the vertical flange constituting an abutment engaging the adjacent edge of said topping rail and the horizontal flange resting on said rail and forming attaching and adjusting means, said horizontal flange being slotted, and fastenings associated with the slots and rail to permit relative adjustment of said plates.

4. In a chicken feeder of the class described, a substantially rectangular box-like open top receptacle for the feed, longitudinal external members fastened to the side walls of the receptacle and serving as supporting ledges, removable standing and runner platforms having their inner end portions seated on said members and abutting the outer surfaces of the side walls, keeper eyes secured to the ends of the receptacle, and hooks carried by the opposite ends of the platform and detachably connectible with said eyes whereby to permit application and removal of the platform.

In testimony whereof we affix our signatures.

JOHN F. BANTZ.
RAYMOND SMITH.